Nov. 10, 1964   H. J. CZIRR   3,156,064
MEANS TO RECOVER A LURE OR THE LIKE
Filed Aug. 21, 1963

INVENTOR.
HERBERT J. CZIRR
BY John H. Widdowson
ATTORNEY

United States Patent Office 3,156,064
Patented Nov. 10, 1964

3,156,064
MEANS TO RECOVER A LURE OR THE LIKE
Herbert J. Czirr, Grand Hotel, Medicine Lodge, Kans.
Filed Aug. 21, 1963, Ser. No. 303,624
5 Claims. (Cl. 43—17.2)

This invention relates to means for recovery of a snagged object, such as a lure or the like. More specifically, the invention relates to means adapted to engage and recover a snagged object, including fishing lures such as plugs, jigs, spinner type lures and the like.

Various means for recovering fishing lures and the like are known to the art and include devices having two concentric generally cylindrical members having openings positionable to receive a fishing line connected to a snagged lure or the like. Such devices are expensive and require two close fitting and mating parts, and any rusting of the parts relative to each other tends to prevent proper functioning of the parts and opening and closing of the necessary openings. In other of the prior art devices a hole or opening for receipt of a fishing line attached to a sunken or snagged lure remains open in operation and no means are provided for closing same, and in such structures the device can easily become removed from the fishing line during removal of the snagged lure.

The present invention eliminates many of the disadvantages of the typical prior art devices. In accordance with the present invention means for recovering a snagged object are provided which includes a body member having an open portion adapted to receive a line or the like attached to the object and retaining means are attached to the body member and movably mounted thereon to open and close the open portion of the body member. The retaining means has line receiving means which in operation receives and holds the fishing line or the like during removal of the snagged object.

Accordingly, it is an object of the invention to provide new means for recovery of a snagged object.

Another object of the invention is to provide new means for recovery of a snagged fishing lure or the like.

Another object of the invention is to provide means for recovery of a sunken object wherein the device has an opening for receipt of a fishing line or the like and means to close the opening and wherein the parts of the device need not be accurately made to conform to each other.

Another object of the invention is to provide new line receiving means for means for recovering a snagged object wherein the line receiving means is mounted so that in operation the line is held by the line receiving means and cannot be inadvertently removed.

Another object of the invention is to provide new means for recovery of a snagged object or the like which is relatively inexpensive to construct and assemble in comparison with prior art devices.

A still further object of the invention is to provide new means for recovery of a snagged fishing lure or the like wherein the device can be used for engaging portions of the lure for removal thereof or can be used in the manner of a bumper to dislodge the lure from a snag.

Various other objects, advantages and features of the invention will become apparent to those skilled in the art from the following description taken in conjunction with the accompanying drawings, in which.

Figure 4:
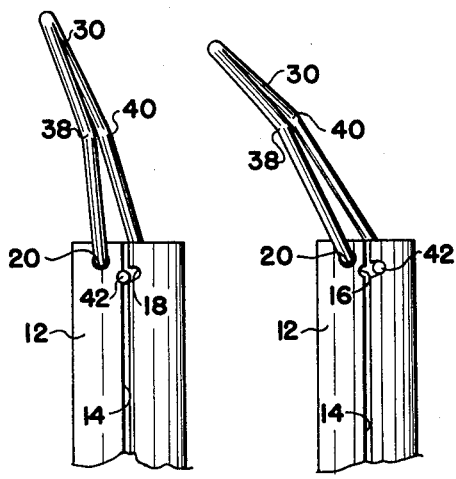

FIG. 4 of the drawings is a side elevation view, partially broken away, illustrating the wire member or bail in position to receive a fishing line or the like.

Figure 5:
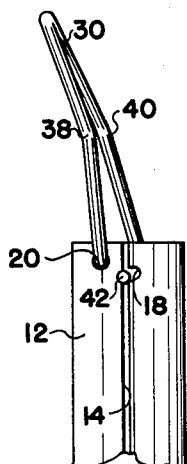

FIG. 5 of the drawings is a side elevation view similar to FIG. 4 illustrating operating position of the wire member or bail whereby the hole or slot is closed to the passage of the fishing line when received therein.

The following is a discussion and description of a preferred specific embodiment of the means for recovery of a sunken object or the like of the invention, such being made with reference to the drawings whereon the same reference numerals are used to indicate the same or similar parts and/or structure. It is to be understood that such discussion and description is not to unduly limit the scope of the invention.

Referring now to the drawings in detail, a preferred specific embodiment of the means for recovering or retrieving the sunken object, such as a fishing lure or the like, is shown generally at 10 and includes a body member 12 which is preferably hollow and generally cylindrical in shape. The body member 12 has a continuous slot 14 through the wall thereof which extends from one end portion of the body member to the other end portion thereof and the slot 14 is preferably enlarged at one end portion of the body member, such as by provision of arcuate recesses 16 and 18 as best illustrated in FIGS. 4 and 5. If desired, the enlarged portion can be continuous and extend from an intermediate portion to an end portion of the body member 12. The end portion of body member 12 having the enlarged portion of the slot therein is preferably provided with two holes or openings therethrough, one hole 20 preferably being located adjacent the enlarged portion of the slot 14 and the other hole 22 preferably being located diametrically opposite from the enlarged portion of the slot.

A plurality of links of chain or the like 24 can be provided and each are secured in the end portions thereof to the lower end portion of the body member 12 opposite from the holes 20 and 22. The chains 24 can be directly connected to the body member 12 or can be attached thereto by use of fastening means, such as S-hooks or the like 26 which are connected to the body member and to the links of chain 24, the hooks 26 being closed to prevent inadvertent removal of the hooks from the body member or the chains from the hooks.

Suitable retaining means are provided and connected to the body member 12 and positioned to open and close the enlarged portion in the slot 14. Preferably, the retaining means is a wire bail member shown generally at 30 and best illustrated in FIG. 3. The wire bail member 30 has an end portion 32 which is pivotally mounted in the hole or opening 20 in the body member 12 and an intermediate portion 34 which is pivotally mounted in the hole or opening 22 of the body member. The portion of the wire bail member 30 between the portions 32 and 34 is shaped to form a closed handle portion shown generally at 36 and preferably the handle portion is bent or shaped at 38 and 40 so that when mounted in the body member the outermost portion of the handle portion is inclined at an angle to the longitudinal axis of the body member as best illustrated in FIGS. 4 and 5. The other end portion 42 of the bail 30 is positioned in the enlarged portion of the slot 14 and the portion of the bail 30 between the end 42 and the portion 34 thereof is desirably shaped by formation of a plurality of convolutions 44, 46 and 48 to form a series of recesses and projections with the portion between the projections 44 and 48 defining a recess or means to receive a fishing line or the like. The projections and recesses formed by the bail between the portions 34 and 42 thereof are substantially perpendicular to the longitudinal axis of the body member and in use is movable relative to the longitudinal axis.

Figure 1:
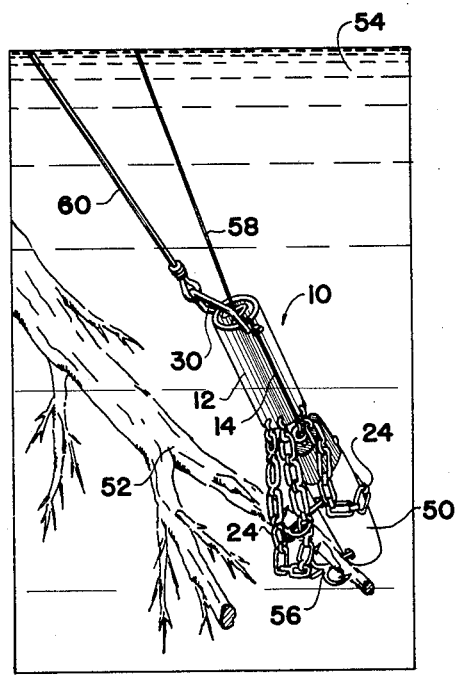
FIG. 1 is a view illustrating a snagged fishing lure and a preferred specific embodiment of the means for recovery of a lure of the invention in engagement therewith.

Use of the recovering means of the invention is best illustrated in FIGS. 1, 4 and 5. A common fishing lure 50 is shown in FIG. 1 caught or snagged on a tree limb, root or the like 52 which is submerged in the water 54. The lure 50 shown in FIG. 1 has so-called gang hooks 56 which have been caught on the tree, roots or the like 52. Attached to the lure 50 is a fishing line 58 leading to the fisherman's rod, pole or the like.

Figure 2:
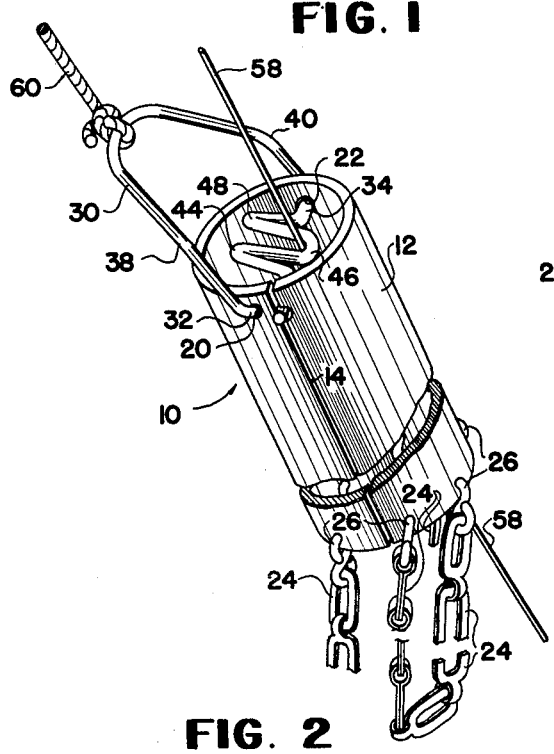
FIG. 2 is an enlarged isometric view, partially broken away, illustrating a preferred specific embodiment of the means for recovery of a lure or the like of the invention and showing a fishing line passing therethrough.

The means for recovering lures 10 of the invention is positioned on the line 58 by moving the bail 30 away from the longitudinal axis of the body member 12 to the position illustrated in FIG. 4 with the end 42 of the bail being positioned in the recess or arcuate portion 18 of the slot 14. The line 58 is then passed through the slot 14 and moved into position in the recess between the projecting portions 44 and 48 of the bail. The links of chain 24 are connected to the body member so that the lower end of the slot 14 is open ot receive the line 58. Preferably, once the line is positioned in the recess one of the links of chain 24 adjacent the slot 14 is lifted and passed over the line 58 so the line 58 is positioned between two adjacent lengths of chain as illustrated in FIG. 2.

With the fishing line 58 thus positioned in the recess of the bail and between two adjacent links of chain 24, the closed handle portion of the bail member 30 is moved toward the longitudinal axis of the body member 12 to thus move the end 42 of the bail into the arcuate recess 16 of the slot 14 and such prevents inadvertent removal of the line 58 during lure retrieving operations. A cord or line 60 is connected to the closed loop or handle portion of the bail 30 and when the device is held by the cord 60 the end 42 is continuously urged into the arcuate portion 16 of the slot 14 as a result of the shape of the handle portion of the bail. Using the cord 60, the lure recovery device 10 is then lowered along the fishing line 58 until the body member 12 and chains 24 are in contact with the lure 50. The lure can then be removed in two different ways, first of all the cord 60 can be raised and lowered to bump the body member 12 against the lure 50 which may dislodge same from the tree, limb or the like 52. If this is unsuccessful, the movement of the body member 12 and chains 24 results in engagement of the chains 24 with the gang hooks 56 and the lure 50 can then be removed by pulling on the cord 60 which is preferably substantially stronger than the normal fishing line 58 and permits a substantial amount of pull on the device without breaking the cord 60. When the lure 50 has been returned to the surface the line 58 is removed from the retrieving means 10 by moving the bail 30 from the position shown in FIG. 5 to the position shown in FIG. 4 so that the line 58 can be passed through the slot 14.

While the lure 50 shown in the drawings has gang hooks thereon, the device of the invention is also usable for retrieving other types of fishing lures, including the so-called jigs or spinner type lures which have only a single hook. In this instance, the body member 12 is used as a bumper and by raising and lowering the device by manipulation of the cord 60 the lure can be disengaged from the snag 52. When using the device for removal of jigs or spinner type lures having a single hook, the chains 24 are not necessary and can be dispensed with. In a similar manner, the device can be used for disengaging a common fishing hook. In some instances the body member 12 can be of size to receive the body of the lure so that the lower end portion of the body member is directly engageable with the hooks on the lure.

Figure 3:
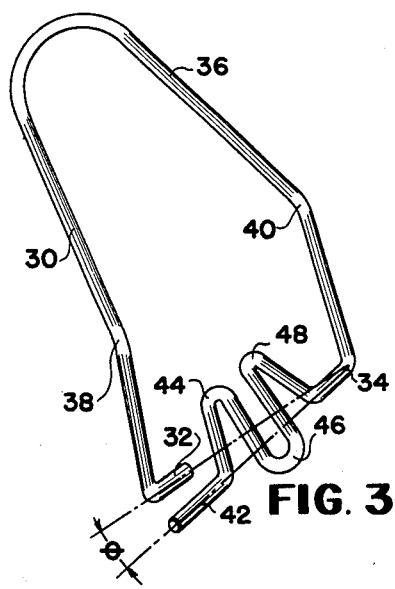
FIG. 3 is an enlarged isometric view illustrating a preferred specific embodiment of the bail or line retaining means used with the invention.

As is best illustrated in FIG. 3 of the drawings, a small actue angle θ is defined by the end 32, the intermediate portion 34 and end 42 of the bail 30 and preferably the angle θ is approximately 2 to 10 degrees. In practice, an angle θ of about 7½ degrees has proved to be quite satisfactory and as a result of this angular relation, the end 42 of bail 30 is moved from the recess 16 to the recess 18 in slot 14 with a minimum of movement of the outer end portion of the bail 30. Also, since holes 20 and 22 are less than a diameter apart in the body member 12 movement of the end 42 of the bail 30 is facilitated.

The lure retrieving means of the invention has been described in connection with a preferred specific embodiment thereof, however it will be understood that this description is intended to illustrate and not to limit the scope of the invention which is defined by the claims.

I claim:

1. Means for recovering a fishing lure or the like when caught on a submerged snag comprising, in combination, an elongated generally cylindrical tubular body member having a continuous slot therein from one end portion thereof to the other end portion thereof with said slot having an enlarged portion at said one end portion of said body member, said one end portion of said body member having a first hole therethrough positioned substantially diametrically opposite from said enlarged portion of said slot and a second hole therethrough adjacent and spaced from said slot, a plurality of links of chains each secured in the end portions thereof to said other end portion of said body member to provide a plurality of loops of chain, a wire bail having one end portion positioned in said second hole in said body member adjacent said slot and having an intermediate portion positioned in said first hole with the portion therebetween being shaped to form a closed handle with the outermost portion of said handle being inclined outwardly relative to the innermost portion thereof and to the longitudinal axis of said body member, the other end portion of said bail being movably positioned in said enlarged portion of said slot with a portion of said bail between said slot and said first hole in said body member being shaped to form a series of recesses and projections disposed in a plane substantially perpendicular to the longitudinal axis of said body member, and a cord attached to said outermost portion of said handle of said bail, said means for recovering a lure or the like being constructed and adapted so that said other end portion of said bail can be moved in said slot and a line attached to the lure can be passed through said slot and positioned in one of said recesses in said bail with said bail being moved in said slot to prevent inadvertent removal of the line so that said body member can be moved along the line into engagement with the lure when snagged and with said chains being engageable with portions of said lure during retrieval thereof.

2. Means for recovering a fishing lure or the like when caught on a submerged snag comprising, in combination, an elongated generally cylindrical tubular body member having a continuous slot therein from one end portion thereof to the other end portion thereof with said slot having an enlarged portion at said one end portion of said body member, said one end portion of said body member having a first hole therethrough positioned substantially diametrically opposite from said slot and a second hole therethrough adjacent and spaced from said slot, a wire bail having one end portion positioned in said second hole in said body member adjacent said slot and having an intermediate portion positioned in said first hole with the portion therebetween being shaped to form a closed handle with the outermost portion of said handle being inclined outwardly relative to the innermost portion thereof, the other end portion of said bail being movably positioned in said enlarged portion of said slot with a portion of said bail between said slot and said first hole in said body member being shaped to form a series of recessed and projections disposed in a plane substantially perpendicular to the longitudinal axis of said body member, and a cord attached to said outermost portion of said handle of said bail, said means for recovering a lure or the like being constructed and adapted so that said other end portion of said bail can be moved in said slot and a line attached to the lure can be passed through said slot and positioned in one of said recesses in said bail with said bail being moved in said slot to prevent inadvertent removal of the line so that said body member can be moved along the line into engagement with the lure when snagged.

3. Means for recovering a snagged fishing lure or the like comprising, in combination, an elongated hollow body member having slot therein from one end portion thereof to the other end portion thereof and having a hole therethrough adjacent said slot and another hole therethrough in a portion thereof opposite from said slot, a wire bail having portions thereof movably mounted in said holes in said body member with the portion of said bail therebetween being shaped to form a handle, another portion of said bail being positioned between said another hole in said body member and said slot and shaped to define a line receiving recess with the portion of said bail in said slot being movable to open and close said slot to pass a line connected to a snagged lure therethrough for receipt by said recess in said bail, and cord means attached to said handle of said bail, said means for recovering a snagged lure or the like being constructed and adapted so that said portion of said bail in said slot can be moved to pass the line therethrough with said line being received by said recess in said bail so that said body member can be moved along the line into engagement with the snagged lure or the like with said body member being engageable with the lure during retrieval thereof.

4. Means for recovering a snagged object or the like having a line attached thereto comprising, in combination, an elongated hollow body member having a slot therein from one end portion thereof to the other end portion thereof and having a first hole therethrough adjacent said slot and a second hole therethrough spaced from said slot and said first hole, bail means having portions thereof movably mounted in said holes in said body member and having a portion positioned in the hollow of said body member adjacent and spaced from said second hole and said slot shaped to define a line receiving recess, said bail means being movable and having a portion positioned relative to said slot to open and close said slot to permit passage of the line connected to the snagged object or the like, and a portion of said bail means being shaped and adapted to form handle means and receive a cord or the like, said means for recovering a snagged object being constructed and adapted so that said slot in said body member can receive the line attached to the snagged object with said bail means closing said slot and receiving the line to permit movement of said means for recovering a snagged object along the line and into engagement with the snagged object.

5. Means for recovering a snagged object having a line attached thereto comprising, in combination, a hollow body member having an opening in the side thereof adapted to receive the line or the like attached to the snagged object to be recovered, bail means having portions pivotally mounted on said body member in spaced relation and having a handle portion shaped and adapted to receive a cord or the like, said bail means having a portion positioned in the hollow of said body member adjacent and spaced from said opening thereof shaped to have a line receiving recess with an adjacent portion of said bail means being positioned relative to said opening of said body member to open and close said opening of said body member when said bail means is pivotally moved relative to said body member, said means for recovering a snagged object being constructed and adapted so that the line attached to the object can be passed through said opening of said body member and received in said recess in said bail means so that said body member can be moved along the line into engagement with the snagged object or the like.

References Cited in the file of this patent

UNITED STATES PATENTS

| | | |
|---|---|---|
| 2,453,245 | McDonald | Nov. 9, 1948 |
| 2,482,037 | Swaim | Sept. 13, 1949 |
| 2,488,996 | Thompson | Nov. 22, 1949 |
| 2,809,460 | Taylor | Oct. 15, 1957 |